(12) United States Patent
Engelhardt

(10) Patent No.: US 6,435,454 B1
(45) Date of Patent: Aug. 20, 2002

(54) HEAT PIPE COOLING OF AIRCRAFT SKINS FOR INFRARED RADIATION MATCHING

(75) Inventor: Michel Engelhardt, Brooklyn, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 07/132,013

(22) Filed: Dec. 14, 1987

(51) Int. Cl.[7] ............................... B64C 1/38; B64C 3/36
(52) U.S. Cl. ..................... 244/117 A; 244/121; 250/352
(58) Field of Search ............................ 244/117 A, 121; 89/36.01; 250/354.1, 342, 352

(56) References Cited

U.S. PATENT DOCUMENTS

| | | | |
|---|---|---|---|
| 2,943,828 A | 8/1960 | Van Driest | 244/117 A |
| 2,979,293 A | 4/1961 | Mount | 244/117 A |
| 3,152,774 A | 10/1964 | Wyatt | 244/117 A |
| 3,517,730 A | 6/1970 | Wyatt | 244/117 A |
| 3,605,878 A | 9/1971 | Coleman | 165/32 |
| 3,637,007 A | 1/1972 | Shlosinger | 165/32 |
| 3,924,674 A | 12/1975 | Basiulis | 165/32 |
| 3,929,305 A | 12/1975 | Sabol | 244/117 A |
| 4,000,776 A * | 1/1977 | Kroebig et al. | 244/117 A |
| 4,273,304 A | 6/1981 | Frosch et al. | 244/117 A |
| 4,463,653 A * | 8/1984 | Pusch et al. | 89/36.01 |
| 4,470,759 A | 9/1984 | Kosson | 417/208 |
| 4,505,124 A | 3/1985 | Mayer | 244/117 A |
| 4,609,034 A * | 9/1986 | Kosson et al. | 89/36.01 |

FOREIGN PATENT DOCUMENTS

| DE | 2848072 | * | 5/1980 | ............... 89/36.01 |

* cited by examiner

Primary Examiner—Michael J. Carone
(74) Attorney, Agent, or Firm—Terry J. Anderson

(57) ABSTRACT

A system and an apparatus for matching infrared radiation emitted from aircraft skins to background infrared radiation in order to minimize the contrast between the two radiations, and to thereby camouflage the aircraft from electro-optical detection systems. In particular, there are employed heat pipe systems and apparatus for cooling the internal surface of an aircraft skin, and especially the bottom portion of an airframe, for the camouflage of the aircraft from the look-up viewing aspect angles of electro-optical detection systems by transferring heat otherwise emitted by the skin to the fuel which is carried by the aircraft.

11 Claims, 3 Drawing Sheets

HEAT PIPE COOLING OF AIRCRAFT SKINS FOR INFRARED RADIATION MATCHING

BACKGROUND OF THE INVENTION

1. Field of the Invention

The present invention relates to a system and an apparatus for matching infrared radiation emitted from aircraft skins to background infrared radiation in order to minimize the contrast between the two radiations, and to thereby camouflage the aircraft from electro-optical detection systems. In particular, the invention relates to the use of heat pipe systems and apparatus for cooling the internal surface of an aircraft skin, and especially the bottom portion of an airframe, for the camouflage of the aircraft from the look-up viewing aspect angles of electro-optical detection systems by transferring heat otherwise emitted by the skin to the fuel which is carried by the aircraft.

Combat aircraft may be readily detected and targeted by passive electro-optical systems which lock-on to the infrared radiation which is emitted from the skins of aircraft. In particular, passive electro-optical systems integrated into missiles, aircraft, and spacecraft are equipped with and employ infrared detection sensors. These systems are adapted to operate from either above or below the target aircraft. In operation, the electro-optical systems take a general reading of the background infrared radiation within the sensor's field of view. Thus, any voltage changes encountered in the background infrared detection profile may be indicative of the presence of combat aircraft.

Under power flight conditions, especially at low altitudes and high speeds, the temperature of an aircraft skin increases due to aerodynamic heating. Electro-optical systems which are disposed either above or below such combat aircraft may be able to detect the presence of the combat aircraft in response to the difference between the relatively colder earth or sky background infrared radiation and the hotter infrared radiation which is emitted by the aircraft. In general, the aircraft becomes susceptible to detection thereof within the 8 to 14 micrometer wavelength band of the electromagnetic spectrum due to its positive infrared contrast signature when compared with background radiation. Consequently, it is desirable for such combat aircraft to incorporate an infrared control system for matching the infrared signature emitted from an aircraft with the associated terrain and/or sky background associated with the position of the aircraft.

2. Discussion of the Prior Art

A number of possible approaches are available for reducing the infrared radiation emitted by an aircraft. For instance, one approach is to provide ducting enabling the conveyance of cold, ambient air to selected, hot portions of the aircraft skin in order to cool those portions. However, cold air ducting results in an overall increase in the volume or dimensions of the aircraft. Such a dimensional increase has the undesired result of increasing the overall cross-section (projected area) of the aircraft, and thereby renders the aircraft more susceptible to detection by radar, electro-optical, and laser detection systems.

Another approach contemplates the ducting of aircraft fuel to desired sections of the heated skin. However, this approach is also subject to drawbacks in that, once again, the required ducting increases the cross-section of the air frame, with the attendant undesired increased detectability of the aircraft by radar, electro-optical, and laser detection systems. Moreover, the ducting of fuel also increases the vulnerability of the aircraft upon being attacked. For example, any penetration of the ducted area by machine gun fire or projectiles carries with it the potential for igniting a fuel fire due to high temperature exposure. In other words, with a distribution of the fuel throughout the aircraft, there is encountered a considerable increase in the probability of igniting the fuel.

Other approaches have dealt with the utilization of the aircraft fuel as both a heat sink and a heat exchange medium for cooling the aircraft; for example, as disclosed in Mayer U.S. Pat. No. 4,505,124. The system described in that patent necessitates the installation of significant amounts of ducting, evaporators, heat exchangers, and pumps. Consequently, the patented system significantly adds to the overall bulkiness or spatial requirements and to the weight of the aircraft, while increasing the vulnerability of the aircraft to projectile ordinance.

Frosch, et al. U.S. Pat. No. 4,273,304, relates to another aircraft cooling system which employs a separate cooling fluid for removing heat from the airframe and for transferring the removed heat to the aircraft fuel through a heat pump and heat exchanger. This patent also relates to an active system requiring extensive installations of pumps and ducting in the aircraft.

A further aircraft heat exchanger system is described in Sabol U.S. Pat. 3,929,305. This particular system relies upon an impulse tube which is ducted from a coolant reservoir past a heated skin section and to a heat exchanger. Heat from the aircraft skin boils the coolant in the tube so as to produce a bubble which expands and forces the coolant fluid through a closed system. In the heat exchanger, the heat acquired by the cooling fluid is transferred to the aircraft fuel. In this patent, there are also disclosed other types of passive heat exchangers, and in particular, a heat pipe. However, in that disclosure, heat pipes are generally criticized for their dependence upon capillary action, their relatively constricted passages, and their sensitivity to gravity or acceleration forces.

Heat pipes are commonly used in satellites as heat exchangers; for example, as disclosed in Wyatt U.S. Pat. Nos. 3,152,744 and 3,517,730. In the former patent, a heat pipe is referred to for the maintaining of a constant temperature on the solar panels of a satellite; whereas in the latter patent, a controllable heat pipe is disclosed for controllably varying the amount of heat which is removed from predetermined portions of the satellite.

Notwithstanding the various cooling systems and apparatus which are presently known and employed in the technology, there remains an unfulfilled need in the art for the provision of an infrared matching system. In particular, a need is evident for an infrared matching system which eliminates the requirements for ducting, and which is capable of reducing the infrared radiation emitted from the skin of an aircraft.

SUMMARY OF THE INVENTION

Accordingly, it is a primary object of the present invention to provide for the novel and unique camouflaging of aircraft, and particularly to protect combat aircraft from detection thereof by infrared detection systems.

A more specific object of the invention is the provision of a substantially uniform temperature throughout the skin of the aircraft in order to camouflage the aircraft against the infrared radiation of the sky and/or terrain background proximate the aircraft, as well as for reducing thermal cyclic stresses acting on the aircraft skin in order to extend the life expectancy of the aircraft skin.

Yet another object of the invention is to transfer heat from the aircraft skin to the fuel of the aircraft in order to preheat the fuel and to thereby increase the overall efficiency of the aircraft engine combustion.

Still another object of the invention resides in the provision for the transferring of heat from the aircraft skin to the fuel contained in the reservoir via the heat pipe.

A further object of the invention relates to the utilization of the heat pipes as structural load carrying members of the aircraft.

The foregoing and other objects of the invention are obtained through the provision of an infrared radiation suppression and matching system and apparatus. The system and apparatus are installed and transported aboard an aircraft and assist in concealing the aircraft from infrared detection systems which may be disposed above, below, or at the same altitude as the aircraft. The portions of the aircraft which generate detectable infrared radiation are known or can be measured through the employment of suitable thermocouples. Heat pipes are attached to applicable interior aircraft surfaces located opposite external heat generating surface portions. Basically, the heat pipe is constructed of an elongated apparatus having a heat receiving end which is connected to the interior surface of the aircraft skin, whereas the other end of the heat pipe is adapted to dissipate heat acquired by the receiving end thereof. The heat dissipating end of the heat pipe is operatively connected, in a heat transferring manner, to the fuel which is stored in a fuel tank carried by the aircraft.

The infrared radiation suppression and matching system includes infrared detectors disposed at various locations about the aircraft for detecting background infrared radiation. In a preferred embodiment of the invention, three such detectors are oriented in three mutually orthogonal directions for monitoring the background radiation emanating and received from such directions. The signals generated by the infrared detectors are transmitted to a suitable control installation, such as the on-board computer of the aircraft. The control installation or computer compares the background radiation signals with the radiation emitted by the aircraft skin.

The power flight conditions (altitude and Mach. number), as determined from the aircraft navigation system, are input into the computer which computes the aircraft skin radiance. The aircraft skin radiance may also be determined (through Planck's Law) by locating thermocouples at various strategic locations on the aircraft skin. Thermocouples will each convert the airframe thermal energy into an electrical signal which is transmitted to the computer for processing.

When the control installation provides indication of the presence of a significant difference between the background radiation and the emitted aircraft radiation of an extent whereby the aircraft would be detectable by infrared detection systems, a control signal is generated and transmitted to the heat pipe.

In the preferred embodiment, the heat pipe is a controllable element of variable heat dissipating ability. Upon receipt of the control signal from the control installation, the heat pipe will commence transferring heat from the skin of the aircraft to the fuel at a rate proportional to the control signal. The heat pipe continues to operate in effectuating the transference of such heat until the radiation emitted from the skin of the aircraft matches the background radiation.

Heat pipes are considered to be particularly useful in the implementation of the invention in as much as they are passive elements and do not require the installation of extensive ducting. Although heat pipes provide a relatively poor performance only when subjected to heavy acceleration modes, such loads are generally only encountered under conditions of close combat after the aircraft has already been detected and has been acquired as a target by enemy aircraft or enemy ordinance. At such time, infrared radiation matching or suppression is a secondary issue in as much as, in all probability, other means have acquired or detected the aircraft. Hence, any reduced performance by the heat pipe during such combat maneuvers is of little consequence.

BRIEF DESCRIPTION OF THE DRAWINGS

Reference may now be had to the following detailed description of preferred embodiments of the invention, taken in conjunction with the accompanying drawings; in which.

DETAILED DESCRIPTION

Figure 1:
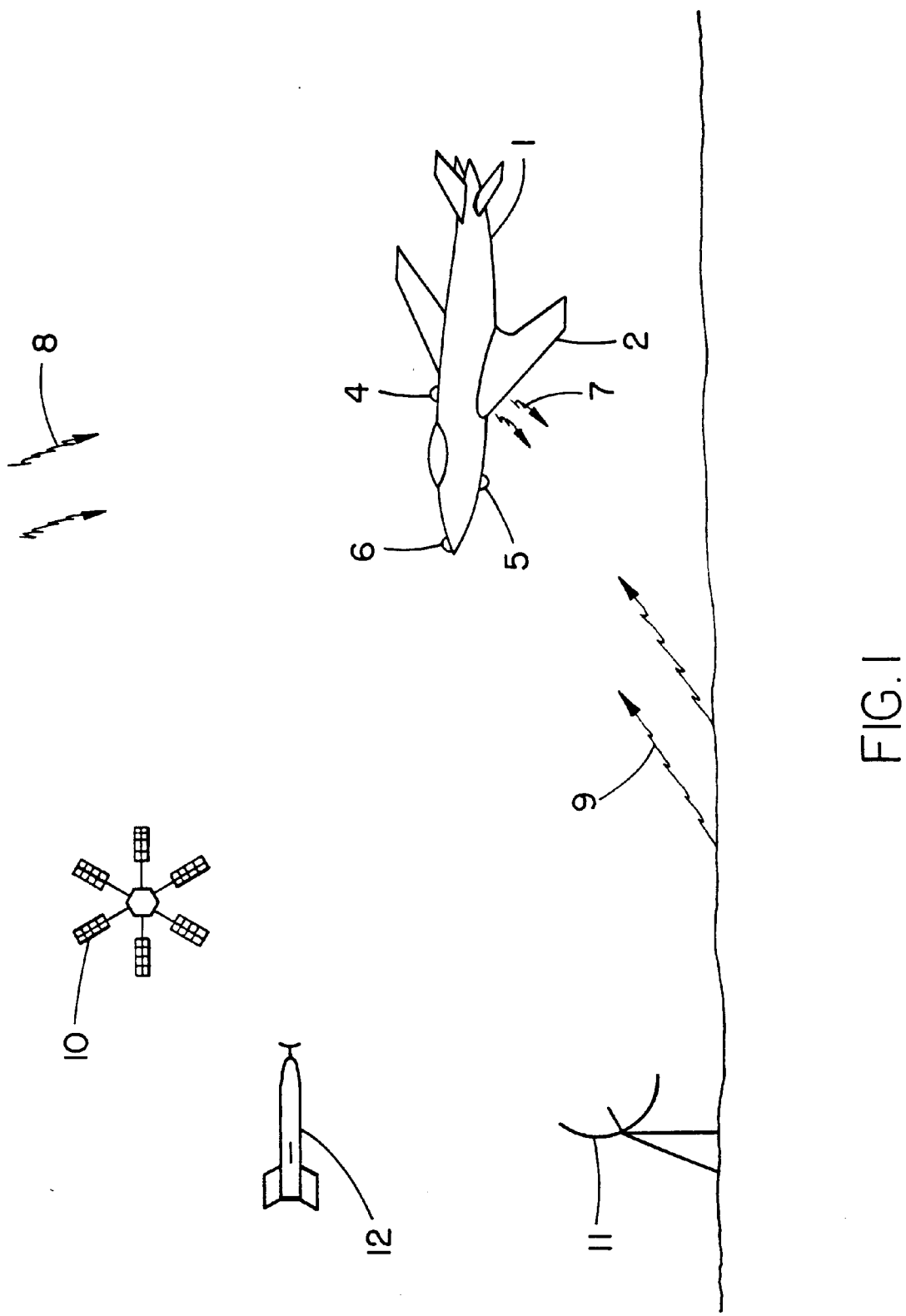
FIG. 1 is a general view of a combat aircraft crossing through a domain having electro-optical detection systems operating in the infrared spectrum.

In FIG. 1, there is generally shown an aircraft 1 entering a domain which is protected by a plurality of infrared detection systems. These systems include satellite detectors 10, ground detectors 11, and airborne detectors 12. The aircraft 1 travels at high rates of speed, typically at one or more times the speed of sound, and generates infrared radiation 7 emanating from wings 2 and other skin areas. The aircraft 1 is equipped with three infrared sensors 4, 5, 6 (or one infrared sensor with look-up, look-out, and look-down capability). The sensors are arranged so as to be able to detect incoming infrared background radiation from three mutually orthogonal directions. Background radiation 8 from the sky constitutes one component in the aircraft sensor's field of view; while, furthermore, background radiation 9 from the terrain and sky also contributes to the infrared radiation striking the aircraft.

Figure 2:
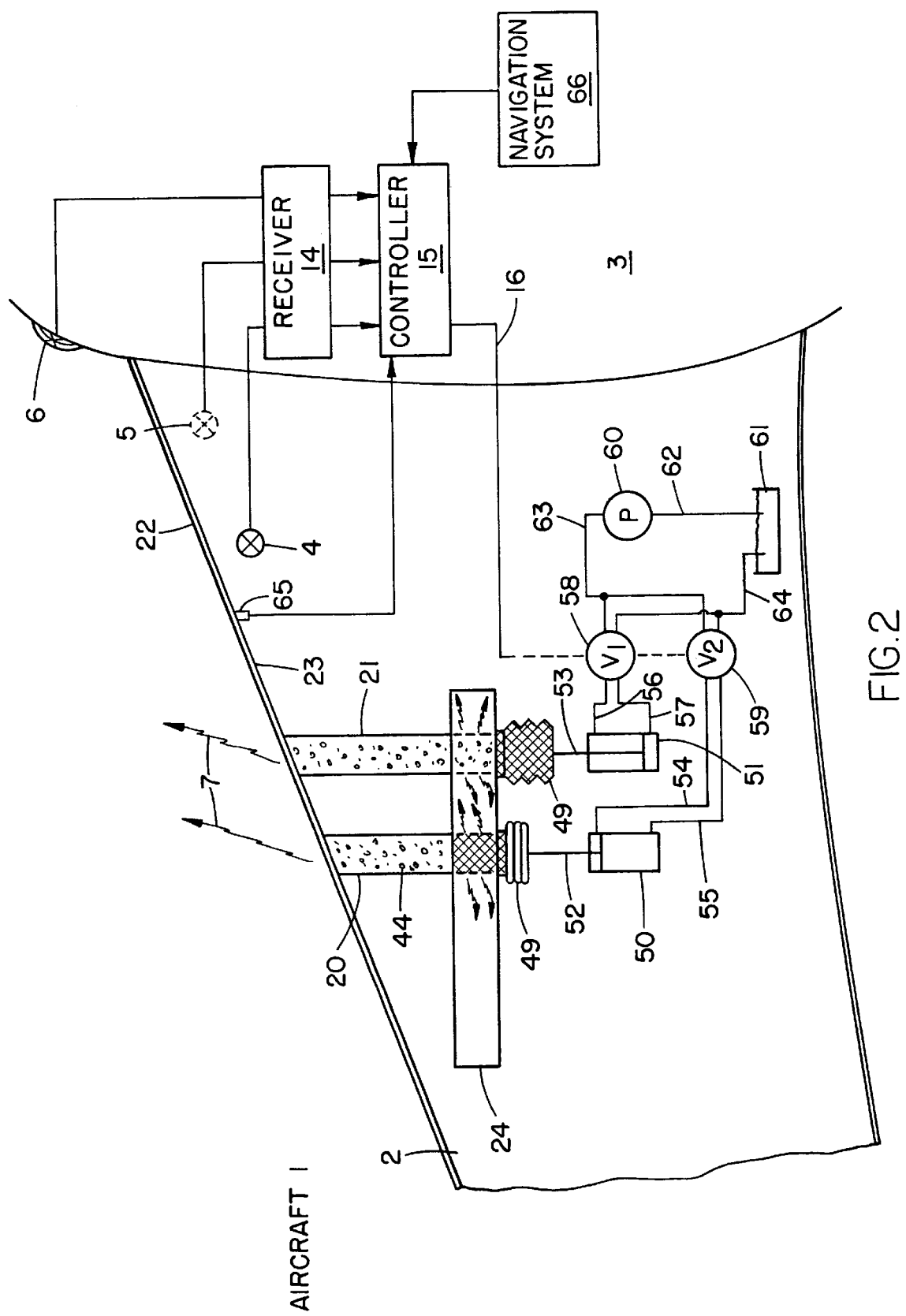
FIG. 2 illustrates a partial schematic plan view of an aircraft fuselage and wing showing the invention installed therein.

Referring to FIG. 2, there is shown in further detail the inventive infrared suppression system. The system is preferably disposed within the wing 2 and fuselage of the aircraft 1. As previously mentioned, the aircraft emits infrared radiation 7 from external skin surfaces 22 as well as from other surfaces thereof. Heat pipes 20, 21 are attached to the interior surface 23 of wing 2 opposite the locations or sources of the emissions of infrared radiation 7. The heat pipes 20, 21 transmit the heat from the wing 2 into the fuel tank 24 where the fuel absorbs the unwanted heat. Heat pipes 20, 21 are controllable by bellows 49 in order to be able to absorb heat at different rates.

The heat pipes 20, 21 per se are well known elements in the art, and are of the type shown and described in Wyatt U.S. Pat. No. 3,517,730, the disclosure of which is incorporated herein by reference. Although the specific operation of a heat pipe is generally well known in the art, the following description is set forth hereinbelow in order to assist in an understanding of the function of the heat pipes 20, 21 in conjunction with the present invention.

Figure 3:
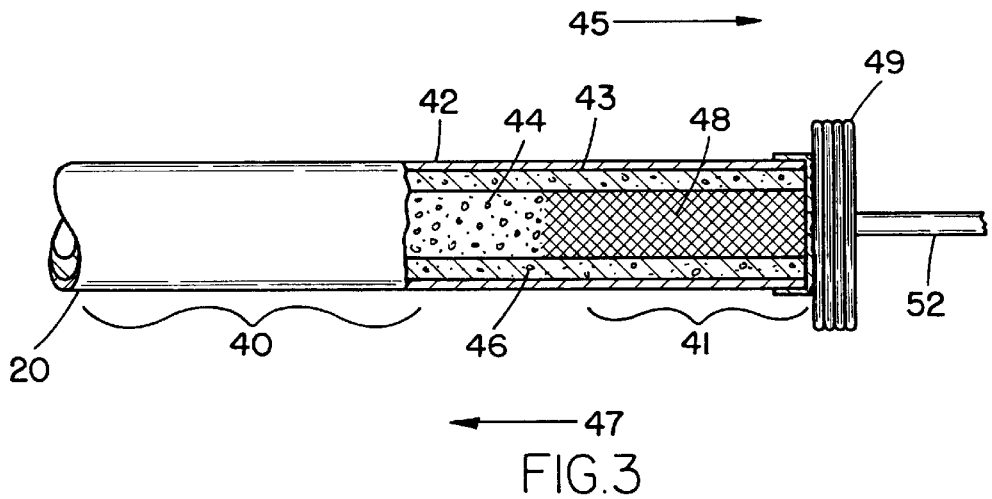
FIG. 3 shows a sectional view illustrating a heat pipe with a control bellows arranged at the output end thereof.

Having particular reference to FIG. 3, it is generally known that heat applied to the input section 40 will be transmitted to the output section 41. The heat pipe 20 contains a readily vaporizable fluid 46 which is conveyed by a wick member 43 from the heat output zone 41 to the heat input zone 40. The fluid 46 carried by the wick 43 is vaporized in the heat input zone 40 and flows as a vapor 44 in the direction indicated by arrow 45 towards the heat output zone 41.

Included within the heat pipe 20 is a non-condensible gas 48, such as air, which is collected in the heat output zone 41 when the bellows 49 is in its collapsed condition. It is well known that the presence of a non-condensible gas; i.e. such as gas 48, in a heat pipe will reduce the ability of the heat pipe to transfer heat. It is also well known that a non-condensible gas 48 in a heat pipe 20 will produce a sharp interface between the vapor phase 44 and the non-condensible gas 48.

Figure 4:
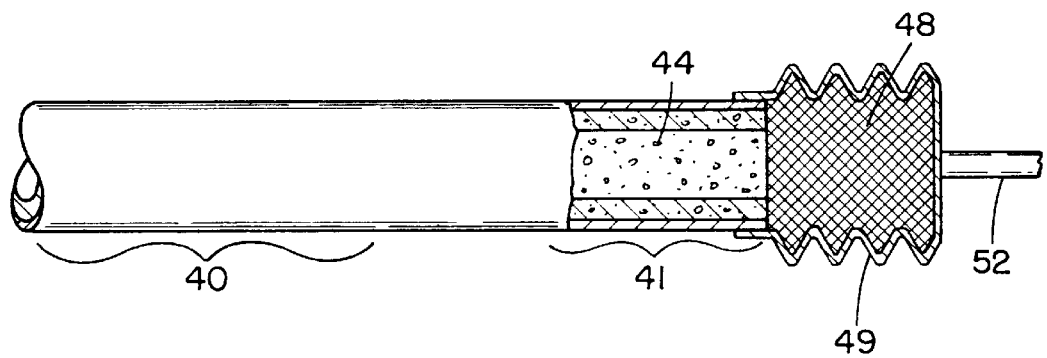
FIG. 4 illustrates another view of FIG. 3 showing the control bellows in the extended condition thereof.

Consequently, it is possible to vary the heat transfer characteristics of heat pipes 20, 21 by withdrawing the non-condensible gas 48 from the heat output zone 41. This withdrawal is accomplished by extending the bellows 49 as shown in FIG. 4. The bellows are operated in response to the controlled actuation of a piston rod 52. The amount of extension of the bellows 49 is infinitely adjustable between its fully contracted position as shown in FIG. 3 and its fully extended position as shown in FIG. 4.

However, when employed for the present invention, the heat pipe need not be necessarily equipped with a bellows, in as much as any heat pipe possessing a variable conductance can be employed, numerous types of which are commercially available.

As is illustrated in FIG. 2, the bellows operating system includes piston rods 52, 53 which are, respectively, connected to pistons enclosed in piston cylinders 50, 51. The pistons within the cylinders are hydraulically operated by selectively imparting and withdrawing hydraulic fluid at the opposite sides thereof in order to force the piston to travel in one or the opposite direction, or to maintain a predetermined stationary position. For this purpose, hydraulic fluid is drawn by a pump 60 from a reservoir 61 so as to flow through a supply line 62. An output line 63 leading from pump 60 conducts hydraulic fluid to directional control valves 58, 59. These directional control valves are generally solenoid-operated valves. The solenoids of the valves are responsive to an electrical signal which is received through an electrical signal control line 16 from controller 15. The controller 15 may be constituted from a separate and distinct element or may be provided as an integral component of the computer which is installed on board the aircraft 1.

The controller 15 is adapted to receive a plurality of electrical signals which are indicative of the infrared radiation detected by the infrared sensors 4, 5, 6 on board the aircraft 1. Background infrared radiation which is incident on the aircraft electro-optical sensors generates an analog signal representative of the infrared radiation detected in the direction in which each of the respective sensors 4, 5 and 6 is oriented. Those signals are transmitted to a receiver 14 which encodes them into suitable format for acceptance by the controller 15. The receiver 14 may be equipped with an analog to digital converter for converting analog output signals from sensors 4, 5, 6 into digital signals which are machine readable by an on-board computer of aircraft 1.

The controller 15 compares the received signals which are representative of background radiation with the level of radiation 7 emitted from particular portions of the aircraft 1. The level of radiation 7 is determined by either thermocouple 65 (which converts thermal energy into electrical energy which is then introduced into controller 15) or by the introduction of an algorithm in controller 15 which computes the radiant thermal emission from aircraft 1 through navigation system input 66 (Mach number, altitude) and Planck's law integrated over the thermal wavelength bands of concern (8 to 12 micrometers). When the comparison indicates that the infrared radiation 7 exceeds the background radiation by an amount which would render the aircraft susceptible to detection by detection systems 10, 11, 12, a control signal is then transmitted over line 16 so as to actuate one or more of the solenoid valves 58, 59 and to thereby activate one or more of the heat pipes 20, 21 in order to reduce the amount of infrared radiation 7 emitted from the external skin surface 22 of the aircraft.

The heat pipes 20, 21 are arranged in such a manner that their respective output ends 41 are disposed in a heat transfer relationship with regard to fuel which is contained in the fuel tank 24. The specific connection of the output ends 41 with the fuel tank 24 is deemed to be within the knowledge of one skilled in the art in heat pipe fabrication and connection, and is not described in detail herein.

In FIG. 2, the inventive system is shown as being in a partial operating mode. Hereby, the sensors 4, 5, 6 have transmitted their analog signals to the receiver 14 which, in turn, has relayed those signals in machine readable form at to the controller 15. The controller 15 has determined that the level of the infrared radiation 7 requires a reduction in its intensity. Consequently, an appropriate signal has been transmitted through the control line 16 to the solenoid of the directional control valve 58. The valve 58 has caused pressurized hydraulic fluid to enter the cylinder 51 from the side containing the piston rod 53, thereby driving the piston in a direction causing the expansion of the bellows 49 of heat pipe 21. When the bellows 49 expands, the non-compressible gas 48 is drawn into the bellows and, as a result thereof, the effective heat dissipating or heat output area 41 is brought within the confines of fuel tank 24. Heat is absorbed by the fuel in fuel contained in the fuel tank 24, resulting in a reduction of the infrared radiation emitted from the external surface 22 of wing 2.

Figure 5:
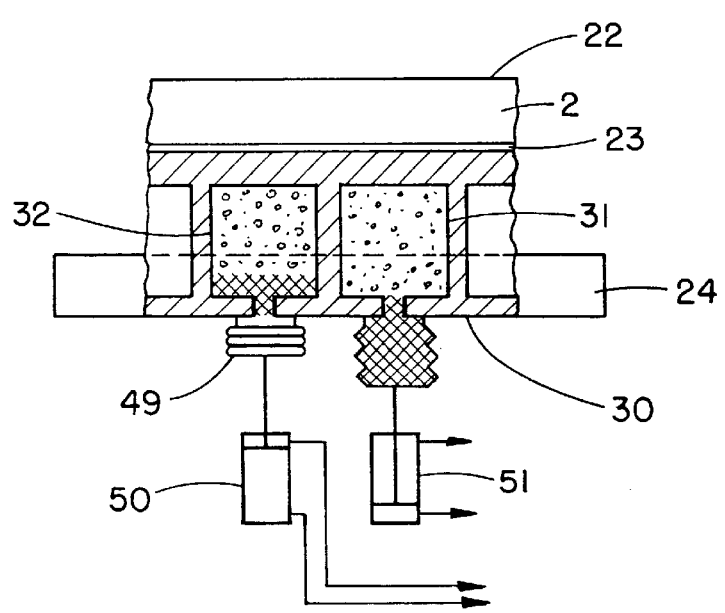
FIG. 5 illustrates a cross-sectional view through another type of heat pipe employed in the invention.

FIG. 5 illustrates an alternate embodiment of the heat pipes, in which the heat are constructed directly on the interior surface 23 of a portion of wing 2. In this instance, the heat pipe 30 includes a plurality of heat pipe cells; two such cells 31, 32 being shown. However, as many cells as required may be provided in order to achieve the necessary infrared matching and suppression. Each cell is equipped with a bellows 49 communicating with the interior of the cell whereby expansion of the bellows will aspirate a portion of the non-condensible gas 48 from the cell. The fuel tank 24 encloses the heat output ends of the plurality of cells of the heat pipe 30. For the remainder, the operation of heat pipe 30 is substantially analogous with that of the individual heat pipes 20, 21. Basically, Wyatt U.S. Pat. No. 3,152,744 discloses a similar type of cellular heat pipe; the disclosure of which is incorporated by reference herein.

Set forth hereinbelow are specific examples of the utilization of the invention under possible operating conditions.

EXAMPLE 1

As a first example, the aircraft 1 is considered to be travelling at Mach 1.5 at an altitude of 30,000 feet, possessing a skin emissivity of 0.9 and an outside skin convective heat transfer coefficient of 48 Btu/hr-ft$^2$—°F. The aircraft 1 is flying over an earth background whose temperature is 60° F. and whose emissivity is 0.8. Moreover, it is assumed that the atmospheric transmittance is 0.7 between the earth and the aircraft and 0.8 between the aircraft and the sensor. At the initiation of supersonic speed, the aircraft has 15,000 lbm of fuel remaining from its total fuel capacity of 20,000 lbm.

Within the 8 to 12 micrometer band of the electromagnetic spectrum, the transmitted earth radiance is 57 Watts/$M^2$ while the aircraft radiance is 119 Watts/$M^2$. Both numbers were computed from Planck's Law predicted on the foregoing information. This results in a positive contrast signature of aircraft 1 of 62 Watts/$M^2$. Therefore, using a heat pipe as a conductor of energy from the skin to the fuel, this results in the decreases in detection range as tabulated in Table 1. The numbers in Table 1 were obtained from mass and energy balances and are based on an aircraft possessing a one-eighth (⅛) inch thick aluminum skin.

TABLE 1

Percent Decrease in Detection Range for Aircraft

| AIRFRAME SKIN TEMPER-ATURE (°R) | HEAT PIPE CAPACITY ×$10^3$ (Btu/hr-ft$^2$) | AIRFRAME SKIN THERMAL RESPONSE TIME (MIN) | FUEL TEMP INCREASE AFTER 1 min/5 min (° F.) | PERCENT DECREASE IN DETEC-TION RANGE (%) |
|---|---|---|---|---|
| 574 | 0 | 0 | 0 | 0 |
| 550 | 1.2 | 1.4 | 1/10 | 21 |
| 525 | 2.4 | 1.8 | 3/21 | 44 |

EXAMPLE 2

As a second example, the same aircraft 1 is considered to be flying at Mach 1.0 at an altitude of 10K ft, with a convective heat transfer coefficient of 72 Btu/hr-ft$^2$ and with the same fuel, skin, and background conditions being present as in Example 1.

Within the 8 to 12 micrometer band, the aircraft radiance is now 112 Watts/$M^2$, which results in a 55 Watts/$M^2$ positive contrast. (It is to be noted that subsonic speeds close to Mach 1 and at low altitudes will result in a positive contrast). Again, employing the heat pipe to transfer heat from the skin to the fuel results in the summary as tabulated in Table 2.

TABLE 2

Percent Decrease in Detection Range for Aircraft

| AIRFRAME SKIN TEMPER-ATURE (°R) | HEAT PIPE CAPACITY ×$10^3$ (Btu/hr-ft$^2$) | AIRFRAME SKIN THERMAL RESPONSE TIME (MIN) | FUEL TEMP INCREASE AFTER 1 min/5 min (° F.) | PERCENT DECREASE IN DETEC-TION RANGE (%) |
|---|---|---|---|---|
| 567 | 0 | 0 | 0 | 0 |
| 550 | 1.2 | 0.8 | 1/1 | 16 |
| 525 | 3.1 | 1.1 | 4/27 | 40 |

Although high-speed or sudden aircraft maneuvers may result in the heat pipes demonstrating a poor performance, this is usually encountered under close combat conditions when the enemy has already locked onto the aircraft. Therefore, the signature suppression is relegated to only a secondary issue. Additionally, if the performance of the heat pipes is degraded during aircraft maneuvers, the skin will then rely upon its transient thermal capacity to maintain its infrared signature low. In particular, bellows-operated and other controllable heat pipes are deemed useful in carrying out the invention. Moreover, a hydraulic operating system is also disclosed since such systems are already included in aircraft; however, direct-acting electromechanical systems are also applicable to the invention. Thus, a solenoid could be connected directly to the heat pipe bellows 49 and operated electrically. Still another modification could be made in the heat sink. It is envisioned that one skilled in the art could employ a separate heat exchanger with heat absorbing fluid disposed between the heat pipe and the fuel tank. The fluid in the heat exchanger would receive heat from the heat pipe and transfer the heat to the fuel. Such a modification would be especially practical if the heat emitting surfaces are located remotely from the fuel tanks of the aircraft.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. An infrared radiation suppression system for concealing the presence of an aircraft having a surface emitting infrared radiation from infrared detection systems, said infrared radiation suppression system comprising means for detecting background infrared radiation in three orthogonal directions or any viewing aspect angle, control means for comparing the emitted radiation to the detected background radition, a heat sink for absorbing heat, a controllable heat pipe having one end connected to said surface and having another end connected to said heat sink, said heat pipe being responsive to said control means for transferring heat from said surface to said heat sink when the infrared radiation from said surface exceeds said background infrared radiation level by a predetermined amount.

2. An infrared radiation suppression system for concealing the presence of an aircraft having a surface emitting infrared radiation from infrared detection systems, said infrared radiation suppresion system comprising means for detecting background infrared radiation in at least one direction, control means for comparing the emitted radiation to the detected background radiation, a heat sink for absorbing heat, said heat sink comprising fuel carried by said aircraft, a controllable heat pipe having one end connected to said surface and having another end connected to said heat sink, said heat pipe being responsive to said control means for transferring heat from said surface to said heat sink when the infrared radiation from said surface exceeds said background infrared radiation level by a predetermined amount.

3. An infrared suppression system as claimed in claim 2, wherein the radiation emitting surface is an external surface of a wing of said aircraft, said heat pipe having said one end connected to the internal surface of said wing, said heat sink comprising fuel stored in said wing and and said other end of said heat pipe being connected to said fuel in a heat transferable mode.

4. An infrared suppression system as claimed in claim 2, wherein said control means terminates the transfer of heat from the surface of said aircraft to said heat sink when the level of emitted radiation from said surface matches the level of background radiation.

5. An infrared suppression system as claimed in claim 2, comprising a heat exchanger disposed between said heat sink and fuel carried by said aircraft, said heat exchanger maintaining said heat sink separate from said-fuel and transferring heat from said heat sink to said fuel.

6. In an aircraft having an external skin covering a frame and enclosing tanks containing fuel within said frame wherein the external skin under powered flight of said aircraft emits infrared radiation which renders said aircraft susceptible to detection by infrared radiation detection systems, the improvement for reducing said infrared emission, comprising an elongated controllable heat pipe having a heat receiving portion and a heat dissipating portion, said heat pipe dissipating heat in response to a control signal, said heat receiving portion being connected with the internal surface of the skin of said aircraft at a location on said skin opposite an external skin surface portion emitting detectable infrared radiation, said heat dissipating portion of said heat pipe being connected to said fuel tank and transferring heat received by said heat pipe to said fuel, infrared sensing means for sensing infrared radition from sources external to said aircraft and generating an output signal representative thereof, control signal generating means including means for receiving signals indicative of the infrared emission from sources external to said aircraft, means for comparing the received signals with the infrared radiation emitted from said external skin area opposite the location at which said heat pipe is connected to said internal skin, and means for generating a control signal to operate said heat pipe for receiving heat and reducing the infrared radiation emitted from said external skin area of said aircraft.

7. An improvement as claimed in claim 6, wherein said heat pipe possesses variable rates for dissipating heat and for dissipating heat in proportion to the signal received from said control signal generating means.

8. A method of infrared radiation suppression with a system for concealing the presence of an aircraft having a surface emitting infrared radiation from infrared radiation detection systems, said method of infrared radiation suppression comprising the steps of detecting background infrared radiation in at least one direction, comparing the emitted radiation with the detected background radiation, and transferring controlled amounts of heat from said aircraft sur-face to a heat sink when the infrared radiation from said surface exceeds said background infrared radiation level by a predetermined amount.

9. An infrared suppression method as claimed in claim 8, comprising detecting the background radiation in three orthogonal directions or any viewing aspect angle.

10. An infrared suppression method as claimed in claim 8, comprising transferring heat from said aircraft to fuel for said aircraft.

11. An infrared suppression method as claimed in claim 8, comprising terminating the transfer of heat from the surface to the heat sink when the level of emitted radiation from said surface matches the level of background radiation.

* * * * *